Jan. 8, 1952 D. KLEIS ET AL 2,582,135

IMAGE TRANSMISSION SYSTEM

Filed March 3, 1948 2 SHEETS—SHEET 1

INVENTORS
DERK KLEIS
MARTINUS VAN TOL
BY [signature]
ATTORNEY.

INVENTORS
DERK KLEIS
MARTINUS VAN TOL
BY [signature]
ATTORNEY.

Patented Jan. 8, 1952 2,582,135

UNITED STATES PATENT OFFICE 2,582,135

IMAGE TRANSMISSION SYSTEM

Derk Kleis and Martinus van Tol, Eindhoven, Netherlands, assignors to Hartford National Bank and Trust Company, Hartford, Conn., as trustee Application March 3, 1948, Serial No. 12,825
In the Netherlands March 6, 1947

6 Claims. (Cl. 179—171)

It is known to reproduce manuscripts or other documents at a distance by optico-electrical means, thus producing a facsimile. As with television, the image to be transmitted is scanned by a narrow light beam at the transmitting station, the light reflected by the image being thrown onto a photo-electric cell so that the electrical signal produced by the cell usually consists of a plurality of positive or negative impulses superposed on a constant voltage. These impulses may include the line and image synchronizing impulses which serve to bring apparatus arranged at the receiver end for recording the image in synchronism with the scanning mechanism at the transmitter end; as an alternative, it is, however, possible to produce these synchronizing impulses separately and to add them subsequently to the signal to be transmitted. The signal of the photo-electric cell may be amplified by a multi-stage amplifier and the amplified signal, which, either caused to modulate a carrier wave or not, is transmitted by way of a lead or wireless, thus finally consists of a succession of image and synchronizing impulses. In the receiver the signal, subsequent to renewed amplification, is fed to the reproducing device which will comprise a recording element, for example a glow-discharge lamp, the light fluctuations of which brought about by the signal impulses, produce the desired contrasts in the image in process of being recorded. The invention relates to an alternating-voltage amplifier which may advantageously be used in such a device for the transmission of images.

If alternating-current amplifiers with resistance-capacity coupling are used for amplifying the signal voltages to be transmitted, difficulties arise in arrangements of the kind referred to, since only those impulses the duration of which is small compared with the time constant of the coupling member, are transmitted by the resistance-capacity coupling without distortion, impulses of larger duration becoming more or less distorted.

In order that the invention may be more clearly understood and readily carried into effect, it will now be described more fully with reference to the accompanying drawing in which.

Figure 1:
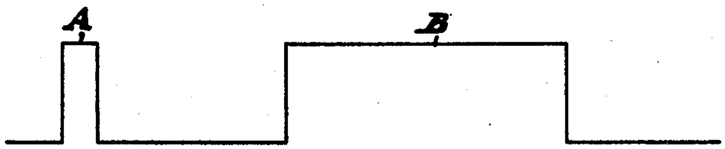
Figure 1 is a graph showing the type of waveform of the voltages existing in systems to which the invention is directed.
Figure 2:
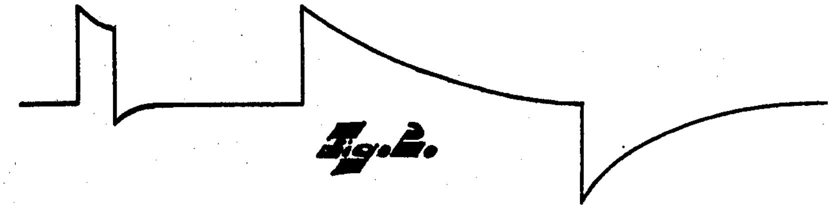
Fig. 2 is a graph showing distortion of the waveform of Fig. 1.
Figure 3:
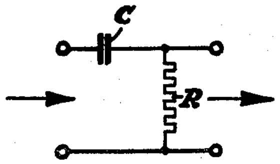
Fig. 3 is a schematic diagram illustrating one form of coupling circuit.

Referring to Fig. 1, A designates a short, B a long impulse, which are fed, for example, to the coupling member shown in Fig. 3, which comprises a condenser C and a resistance R. The output terminals of the coupling member have thus set up across them a voltage exhibiting a variation as shown in Fig. 2. The impulse A′ is only slightly distorted, but the impulse B′ is distorted to a marked extent. The distorted impulse cannot be used for modulating the glow-discharge lamp, so that particular measures are required for obviating the resultant disadvantages.

In a known circuit-arrangement this is achieved by utilizing a regularly occurring impulse which is produced in the transmitter and corresponds to a definite, constant image brightness. It is common practice to use for this purpose the line-synchronizing impulses which, at the transmitter end, are produced between the scanning of two image lines. The circuit-arrangement may be such that in the received image these impulses also correspond to a definite, constant brightness. By controlling the signal strength in the output circuit of the receiver the brightness ratios in scanned object and received image may be caused to be identical.

Figure 6:
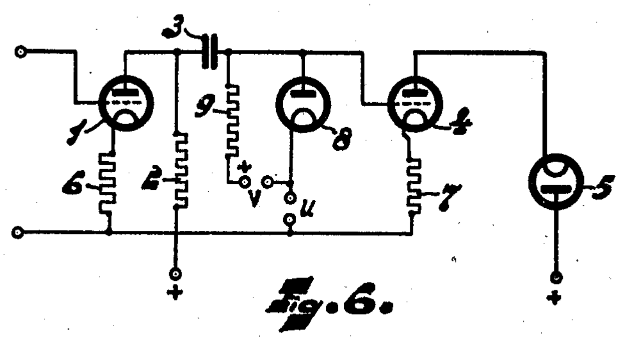
Fig. 6 is a schematic diagram illustrating one form of circuit arrangement for transmitting voltages of the above-mentioned type.

A section of a receiving circuit-arrangement to which this principle is applied is shown in Fig. 6 of the drawing. In this figure, 1 designates a tube of the receiver shown as a triode at the grid of which the signal voltage to be amplified is applied. The anode circuit of the tube 1 is connected through a resistance 2 to the positive terminal of a voltage supply (not shown) and through a condenser 3 to the grid of an output amplifier valve 4, also shown as a triode. The anode circuit of tube 4 may include the element serving for converting current fluctuations into light fluctuations, which element is shown as a glow-discharge lamp 5, the cathode of which is connected to the anode of the tube 4 and the anode to the positive terminal of a supply in the usual manner. By the use of resistances 6 and 7 included in the cathode lead of tubes 1 and 4 a given negative bias potential is applied to the respective grids. These resistances are either shunted by condensers or not; in the latter case a negative feedback is produced at all frequencies thereby bringing about a linear amplification which is of particular advantage when half tones are to be transmitted.

Inserted between the control grid of the tube 4 and the positive terminal of a bias-voltage source (not shown) having a voltage V is a high resistance 9 and inserted between the grid and earth is a diode 8, if necessary, in series with a bias-voltage source having a voltage U.

Figure 4:
Fig. 4 is a graph illustrating the voltage waveform produced when scanning an image having portions thereof at different light intensities.

If in the transmitter there are scanned in succession lines of high brightness followed by lines of low brightness and then again lines of the original brightness, the signal, prior to passing through the resistance-capacity coupling members of the amplifier will exhibit the shape shown in Fig. 4. The positive impulses correspond to a definite image brightness. If this signal passes through a resistance-capacity coupling member having a time constant RC, it will after passing therethrough exhibit the variation shown in Fig. 5, the initial slopes of the curves varying, as in Fig. 2, with the said time constant. If the output valve, the anode circuit of which includes the glow discharge lamp, were controlled by this signal, the peaks of the positive impulses corresponding to constant brightness in the scanned object would produce different brightnesses in the image. This disadvantage is obviated in the circuit-arrangement of Fig. 6. This circuit-arrangement operates as hereinafter described:

A fractional part of the voltage is applied to the grid of tube 4 through the resistor 9 which together with the diode 8 connected in series therewith forms a voltage divider. Since only a relatively small voltage drop occurs through the diode, the grid of tube 4 accordingly assumes a potential substantially equal to the potential of the cathode of the diode. The condenser 3 assumes a charge which is proportional to the potential difference occurring across its electrodes.

Figure 5:
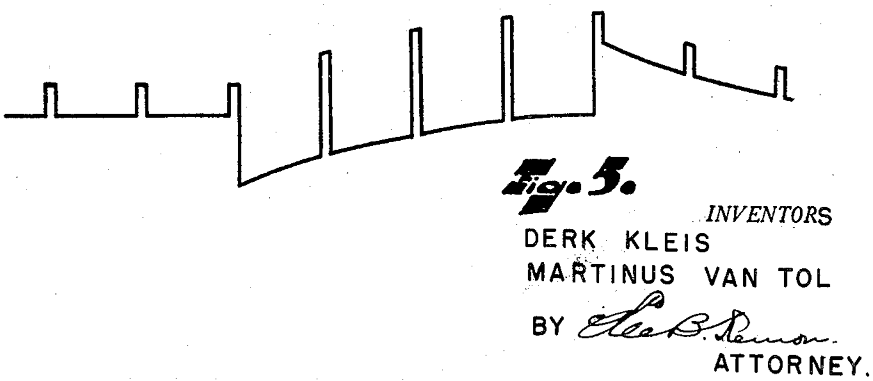
Fig. 5 is a graph illustrating distortion of the waveform of Fig. 4.

If the signal of Fig. 5 occurs in the anode lead of the tube 1, the diode 8 will be conductive during the positive impulses, with the result that at the peak of the impulse a greater potential difference is applied to the condenser 3 and the condenser is charged in such a sense that the electrode thereof connected to the diode is negative relative to the other electrode. The charging of the condenser continues until the grid voltage is approximately U volts at the occurrence of the peak of the impulse. The impedance of the diode being low, this charging can take place completely in spite of the short impulse duration.

During the period between two impulses the charge on condenser 3 is reduced via the resistance 9, so that in this interval the voltage across the capacity 3 varies to the effect that the grid of the tube becomes less negative and this voltage variation is superposed on the signal. During the first and second parts of the signal shown in Fig. 4, the impulse peak will, consequently, be invariably higher than the prior peak, so that during each peak the diode will be conductive and will charge the capacity 3 until the peak of the impulse corresponds to the voltage of the neutral lead.

During the third part of the signal, when between the impulses the voltage in the anode lead drops, it will be possible for this drop to be compensated by the increase in grid voltage owing to the positive charge of the capacity 3 through the resistance 9. The bias voltage V and the time constant of the coupling member must be such that even during the third part of the signal each impulse peak lies at a higher voltage level than the preceding one, so that during each impulse the diode becomes conductive and irrespective of the value of the signal between two impulses each impulse peak is caused by the voltage across the grid of the tube 4 to be located at a definite level, in this case the zero level. Each impulse peak consequently corresponds to a zero voltage across the grid of tube 4.

In the light signal of the glow discharge lamp 5, obtained in such a circuit-arrangement, the impulse peak will again correspond to a constant brightness.

Figure 8:
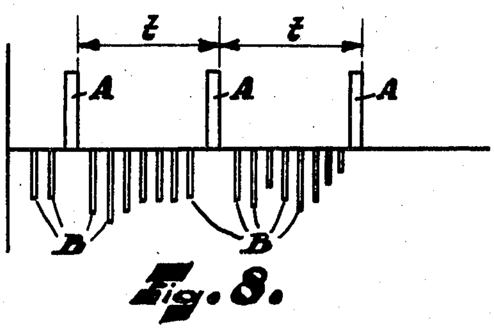
Fig. 8 is a graph illustrating the image signal pulses and their relationship to the synchronizing pulses.

Fig. 8 shows the current produced in the output circuit of tube 4 as a function of time. Referring to this figure A designates the positive voltage impulse occurring at the end of each line scanning period T, whereas the negative image impulses are designated B. The horizontal line represents for example, the voltage which corresponds to the white brightness level of the paper. The impulse A may be obtained in the transmitter in that at the end of the scan line the light beam falls upon a reflecting element which reflects the incident light to a greater extent towards the photo-electric cell than white paper, so that during the scanning of the image by the light beam the photo-electric cell is highly illuminated for a moment. However, as an alternative, it is possible to cause the light beam, at the end of each line to fall into an aperture; in this case the impulse corresponds to absolute black. In the output circuit of the last but one amplifier the impulse must have positive polarity in the circuit-arrangement shown. If the polarity is negative, the diode must be connected conversely; in this case the impulse peak is fixed at a point on the lower side of the characteristic curve of the tube.

The level of the output voltage is thus controlled, in the manner described, by means of the impulse A, it being possible by proper choice of the parameters of the tube 4 also to effect a limitation of the peaks B, so that these peaks in the output circuit are all of substantially the same height, which may be conducive to the legibility of the transmitted document.

The circuit-arrangement described may be used where it is possible for the anode resistance 2 of tube 1 to be comparatively small, as in the case of television. If such is not the case, as in the above described amplifiers for image transmission, the current produced in the diode when a positive voltage impulse occurs will provoke such an additional charge of the anode circuit of tube 1 that the impulse is distorted or even vanishes completely in an inadmissible manner, which is naturally particularly detrimental if as is the common practice, the impulse must serve for synchronisation in a section of the receiver following the circuit-arrangement shown. The distortion is due to the fact that the said diode current by which the condenser 3 is charged also causes a current to pass through the anode resistance 2, which current brings about a voltage drop across the anode of the amplifying tube 1. The positive impulse is thus, as it were cut off. This phenomenon might be suppressed by minimizing the anode resistance 2, but this would involve a great loss of amplification. For this reason use is made, according to the invention, of a different expedient, which consists in that the electrodes of the rectifier are connected through condensers to the anode and cathode of the preceding amplifying tube and the anode and cathode leads both comprise impedances of the same kind, the diode having furthermore connected in parallel to it a resistance, from which the output voltage is taken, whilst the said impedances, condensers and resistances are chosen to be such that the impulse is hardly weakened. The said impedances in the cathode and anode leads are preferably resistances.

Figure 7:
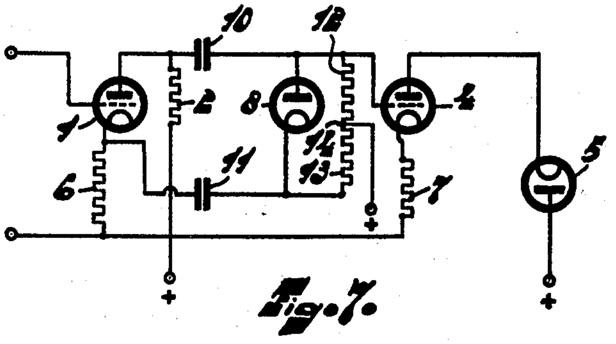
Fig. 7 is a schematic diagram of a circuit arrangement in accordance with the invention.

Fig. 7 shows a circuit-arrangement according to the invention for the input circuit of the output stage of an amplifier the amplifying tube being again designated 1 and its anode circuit comprising the resistance 2; the anode of the diode 8 is connected through a condenser 10 to the anode of the tube 1, whereas the cathode of the diode is connected through a condenser 11 to the cathode of the tube 1. A series-combination of two resistances 12 and 13 is connected in parallel to the diode. The resistance 6 in the cathode lead has a value such as to bring about a highly negative feed-back and therefore is not shunted by a condenser. The upper end of the resistance 12 is connected to the grid of tube 4, the anode circuit of which again comprises a glow-discharge lamp 5. The cathode of tube 4 is earthed through resistance 7. The junction point 14 between the resistances 12 and 13 is connected to a terminal of a bias-voltage source or is earthed.

A proper choice of the values of the resistances 2 and 6, of the condensers 10 and 11 and of the resistances 12 and 13 ensures that said impulse when occurring across the input circuit of tube 4 is undistorted. The current produced upon the occurrence of a positive impulse across the anode of the tube 1 for example an impulse as shown in Fig. 4 thus passes not only through the anode resistance 2 but also through the condensers 10 and 11 and the feedback resistance 6, both the condensers 10 and 11 being thus charged. As in the case of the condenser 3 of Fig. 6, the condenser 10 becomes charged at the peak of the impulse with its electrode which is connected to the diode assuming a negative potential. The charge is reduced during the periods between pulses through the resistor 12. From a simple consideration it is clear that, if $R_a$ and $R_k$ designate the values of the resistances 2 and 6 $C_1$ and $C_2$ the capacities of the condensers 10 and 11 and $R_1$, $R_2$ the values of the resistances 12 and 13 optimum results are achieved if $$R_aC_1 = R_kC_2$$

and further:

$$R_1C_1 = R_2C_2$$

The adjustment is, however, not critical.

As an alternative, the grid of tube 4 may be connected to the lowermost point of resistance 13, where the output signal occurs with reverse polarity. The choice of the connecting point consequently depends on whether it is desired to obtain a positive or a negative print.

Although in the foregoing transmission of manuscripts was referred to, the image voltages being in general impulse-like, the invention may also be carried into effect if the image required to be transmitted exhibits intermediate tinges and the image voltages vary more smoothly. Furthermore, although the invention is particularly useful for transmission of images, it may, in principle, be applied to television.

What we claim is:

1. An image transmission system for a signal voltage having periodically recurring impulse components, comprising, a first electron discharge tube system having a cathode, a control grid and an anode, a first impedance element connected to said cathode, a second impedance element connected to said anode, means to apply said signal voltage to said control grid and to said cathode through said first impedance element, a unidirectional current conducting element having two electrodes, a first capacitor interconnecting one of said electrodes to the said anode, a second capacitor interconnecting the other of said electrodes to the said cathode, a third impedance element having its ends connected to the electrodes of the said unidirectional conducting element, and an output electron discharge tube system having a control grid connected to one end of said third impedance element.

2. An image transmission system for supplying to a glow discharge lamp or the like a signal voltage having periodically recurring impulse components, comprising a first electron discharge tube system having a cathode, a control grid and an anode, a first impedance element connected to said cathode, a second impedance element connected to said anode, means to apply said signal voltage to said control grid and to said cathode through said first impedance element, a unidirectional current conducting element having two electrodes, a first capacitor interconnecting one of said electrodes to the said anode, a second capacitor interconnecting the other of said electrodes to the said cathode, third and fourth impedance elements connected in series and having their free ends connected to the electrodes of the said unidirectional conducting element, means to apply a positive potential to the junction of said third and fourth elements, an output electron discharge tube system having a cathode, a control grid and an anode, and means to connect said control grid to one of said free ends of said third and fourth impedance elements.

3. An image transmission system for a signal voltage having periodically recurring impulse components, comprising a first electron discharge tube system having a cathode, a control grid and an anode, a first resistor element connected to said cathode, a second resistor element connected to said anode, means to apply said signal voltage to said control grid and to said cathode through said first resistor element, a unidirectional current conducting element having two electrodes, a first capacitor interconnecting one of said electrodes to the said anode, a second capacitor interconnecting the other of said electrodes to said cathode, a third resistor element having its ends connected to the electrodes of the said unidirectional conducting element, and an output electron discharge tube having a control grid connected to one end of said third resistor element.

4. An image transmission system for a signal voltage having periodically recurring impulse components, comprising a first electron discharge tube system having a cathode, a control grid and an anode, a first impedance element connected to said anode, a second impedance element connected to said cathode, means to apply said signal voltage to said control grid and to said cathode through said second impedance element, a unidirectional current conducting element having two electrodes, a first capacitor interconnecting one of said electrodes to the said anode, a second capacitor interconnecting the other of said electrodes to the said cathode, a third impedance element having its ends connected to the electrodes of the said unidirectional conducting element, and an output electron discharge tube having a control grid connected to one end of said third impedance element, the values of said first and second impedances being a ratio inversely to the ratio of the values of said first and second capacitors.

5. An image transmission system for a signal voltage having periodically recurring impulse components, comprising a first electron discharge tube system having a cathode, a control grid and an anode, a first resistor element connected to said anode, a second resistor element connected to said cathode, means to apply said signal voltage to said control grid and to said cathode through said second resistor element, a unidirectional current conducting element having two electrodes, a first capacitor interconnecting one of said electrodes to the said anode, a second capacitor interconnecting the other of said electrodes to said cathode, third and fourth resistor elements connected in series and having their free ends connected to the electrodes of the said unidirectional conducting element, means to apply a fixed potential to the junction of said third and fourth resistors, and an output electron discharge tube having a control grid connected to one of said free ends of said third and fourth resistors, the values of said third and fourth resistors being in a ratio inversely to the ratio of the values of said first and second capacitors.

6. An image transmission system for a signal voltage having periodically recurring impulse components, comprising a first electron discharge tube system having a first cathode, a first control grid and a first anode, a first resistor element connected to said anode, a second resistor element connected to said cathode, means to apply said signal voltage to said control grid and to said cathode through said second resistor element, a rectifier having a second cathode and a second anode, a first capacitor interconnecting the said second anode to the said first anode, a second capacitor interconnecting the said second cathode to the said first cathode, third and fourth resistor elements connected in series with respectively the free end of said third resistor connected to said second anode and the free end of said fourth resistor connected to said second cathode, and an output electron discharge tube having a control grid connected to the said free end of said third resistor, said first and second resistors having values in a ratio inversely to the ratio of the values of said first and second capacitors, and said third and fourth resistors having values in a ratio inversely to the ratio of the values of said first and second capacitors.

DERK KLEIS.
MARTINUS VAN TOL.

REFERENCES CITED

The following references are of record in the file of this patent:

UNITED STATES PATENTS

| Number | Name | Date |
|---|---|---|
| 2,338,412 | Dallos | Jan. 4, 1944 |
| 2,468,197 | Hathaway et al. | Apr. 26, 1949 |